United States Patent
Maturino

(10) Patent No.: US 7,503,549 B2
(45) Date of Patent: Mar. 17, 2009

(54) HITCH LIFT DEVICE

(76) Inventor: Steve Maturino, 1007 Shamrock St., Corona, CA (US) 92880

( * ) Notice: Subject to any disclaimer, the term of this patent is extended or adjusted under 35 U.S.C. 154(b) by 60 days.

(21) Appl. No.: 11/708,875

(22) Filed: Feb. 20, 2007

(65) Prior Publication Data

US 2007/0284560 A1    Dec. 13, 2007

Related U.S. Application Data

(60) Provisional application No. 60/813,166, filed on Jun. 13, 2006.

(51) Int. Cl.
*B66D 1/36* (2006.01)

(52) U.S. Cl. .................. 254/338; 254/336; 280/491.5; 280/433; 280/441.1

(58) Field of Classification Search ............... 254/334, 254/338, 383, 336; 280/491.5, 511, 416.1, 280/433, 438.1, 441.1
See application file for complete search history.

(56) References Cited

U.S. PATENT DOCUMENTS

| | | | | |
|---|---|---|---|---|
| 2,928,684 A | * | 3/1960 | Geiger | 280/425.1 |
| 3,881,749 A | * | 5/1975 | Berends | 280/417.1 |
| 5,085,408 A | * | 2/1992 | Norton et al. | 254/325 |
| 6,213,492 B1 | * | 4/2001 | Ceccarelli, III | 280/491.5 |
| 6,951,345 B2 | * | 10/2005 | Wilks | 280/477 |
| 7,168,727 B2 | | 1/2007 | Dick | |
| 2004/0256607 A1 | * | 12/2004 | Spitsbergen | 254/334 |

\* cited by examiner

*Primary Examiner*—Emmanuel M Marcelo
(74) *Attorney, Agent, or Firm*—J. Curtis Edmondson

(57) ABSTRACT

Disclosed is a device for lifting and storing $5^{th}$ wheel hitches from pickup truck beds. The $5^{th}$ wheel hitch lifting device consists of modified kingpin hitch, a hoist, and a support structure for the hoist. The modified kingpin hitch utilizes a detachable or integrated loop that allows the hook on a hoist to lift the hitch. Also described is a method for using the $5^{th}$ wheel hitch lifting device.

9 Claims, 4 Drawing Sheets

HITCH LIFT DEVICE

This application claims the benefit of U.S. Provisional Application 60/813,166 filed on Jun. 13, 2006.

BACKGROUND OF THE INVENTION

1 Field of the Invention

The present invention is in the field of lifting devices in general and for devices to lift hitches designed for "fifth wheel trailers" in particular.

2 Discussion of the Related Art

The use of recreational vehicles has great popularity in the United States. One type of a recreational vehicle is a "fifth wheel". Fifth wheel trailers are towed behind pickup trucks via a pivoting mount located in the bed of the pickup. The practicality and popularity of fifth wheel trailers are obvious. The cost of the trailer is reduced since a single axle is eliminated and the pickup provides the locomotion, thus eliminating the need for a motor. As shown in FIG. 1, a typical configuration of the fifth wheel typically consists of an "gooseneck" type trailer where a portion of the trailer overlaps the bed of the pickup.

Mounted beneath the trailer (trailer referring to either a gooseneck or $5^{th}$ wheel trailer) is a ball assembly called a "kingpin". The kingpin provides the point where the trailer is connected to a hitch. The hitch is designed to accept a kingpin and allow the trailer to be pulled and pivot. The kingpin and hitch interface must be designed so that a considerable force and load will not result in failure. Consequently, hitches are fabricated from extremely durable and stress resistant materials. The durability of the hitch materials, which is usually steel, results in an extremely heavy hitch. Also, the hitch is bolted into the bed of the pickup, either by removable bolts or by a series of clips.

A significant number of individuals only use their trailers on a limited basis, for example, for summer camping or on weekends. While the trailer is not in use, the presence of the hitch mounted in the truck bed can be an obstacle to the use of the truck bed. Also, when the trailer is detached, the hitch is exposed to the elements causing degradation of the hitch assembly. Likewise, if the truck is parked outdoors, the hitch may become the target of thieves.

As previously mentioned, a typical hitch may weigh upwards of several hundred pounds. It is sometimes problematic for a single person to remove the hitch due to the weight of the hitch. For a person with a disability, removal of the hitch is nearly impossible without help from another person. In both cases, a single person can be somewhat limited in the ability to install and remove the hitch.

Prior solutions to this problem have included the redesign of the $5^{th}$ wheel hitch. For example, U.S. Pat. No. 7,168,727 (Jan. 30, 2007) to Dick proposes that the ball of the $5^{th}$ wheel hitch be reversible. This design does eliminates the hitch interference, but suffers from incompatibility with existing trailers that utilize a kingpin mounted on the trailer.

Since there are a large number of existing $5^{th}$ wheel trailers on the market, installation of and there is a problem with the removal of the hitches from pickup truck beds by a single person. Consequently, it is desirable to have a mechanism that would allow a $5^{th}$ wheel hitch assembly to be removed by a single person.

SUMMARY OF THE INVENTION

It is thus an object of the invention to provide a mechanism for removing and installing a $5^{th}$ wheel hitch assembly from a truck bed that is operable by a single person.

It is a further object of the present invention to provide a mechanism for removing and installing a $5^{th}$ wheel hitch from a truck bed such that the hitch can be conveniently stored inside a garage.

It is yet another object of the present invention to provide a mechanism for removing and installing a trailer hitch that is compatible with standard 2" assemblies.

It is yet another object of this invention to provide a modified kingpin that has a removable lifting point.

DETAILED DESCRIPTION

Figure 1:
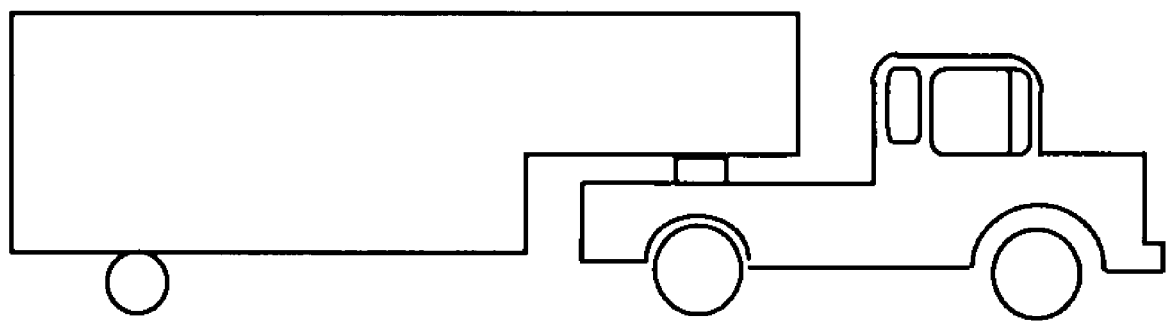
FIG. 1 is the prior art depicting the $5^{th}$ wheel trailer, the kingpin, the hitch, and the pickup.
Figure 2:
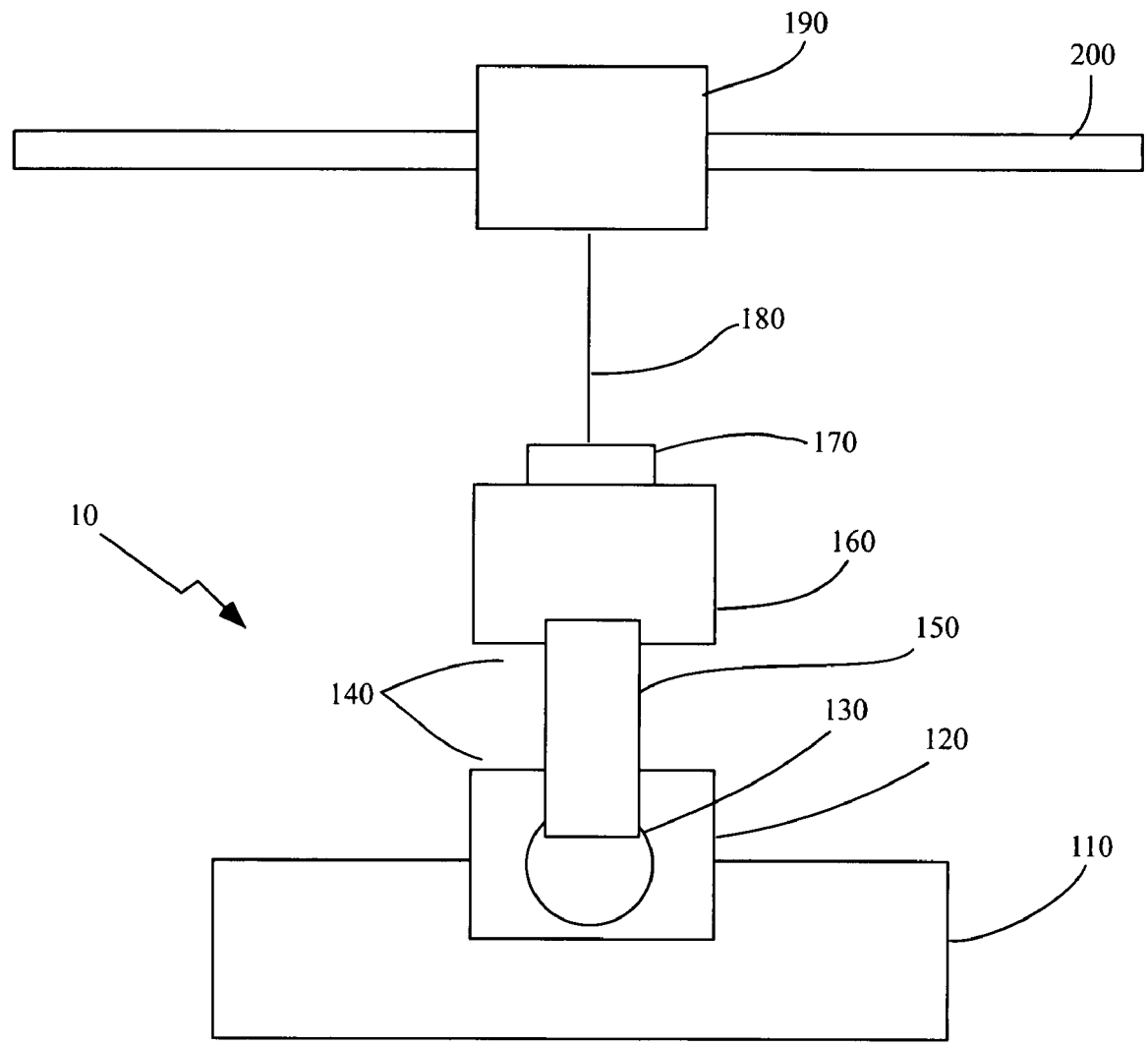
FIG. 2 is schematic diagram of the hitch lift device, the hitch, and the truck.

The present device is a hitch lifting system. Referring to FIG. 2, a general schematic of the hitch lifting system 10 is shown. The hitch lifting system 10 consists of a hitch assembly 110, the hitch assembly 110 supports a kingpin receptacle base 120 and a kingpin receptacle 130. The hitch assembly mates to a kingpin connector 140. The kingpin connector 140 consists of a kingpin 150, a mount 160 affixed to the kingpin 150, and attachment point 170 integral to the mount 160. A cable 180 is connected between the attachment point 170 on the kingpin connector 140 and a lifting device 190. The lifting device 190 is supported by a support structure 200.

Figure 3:
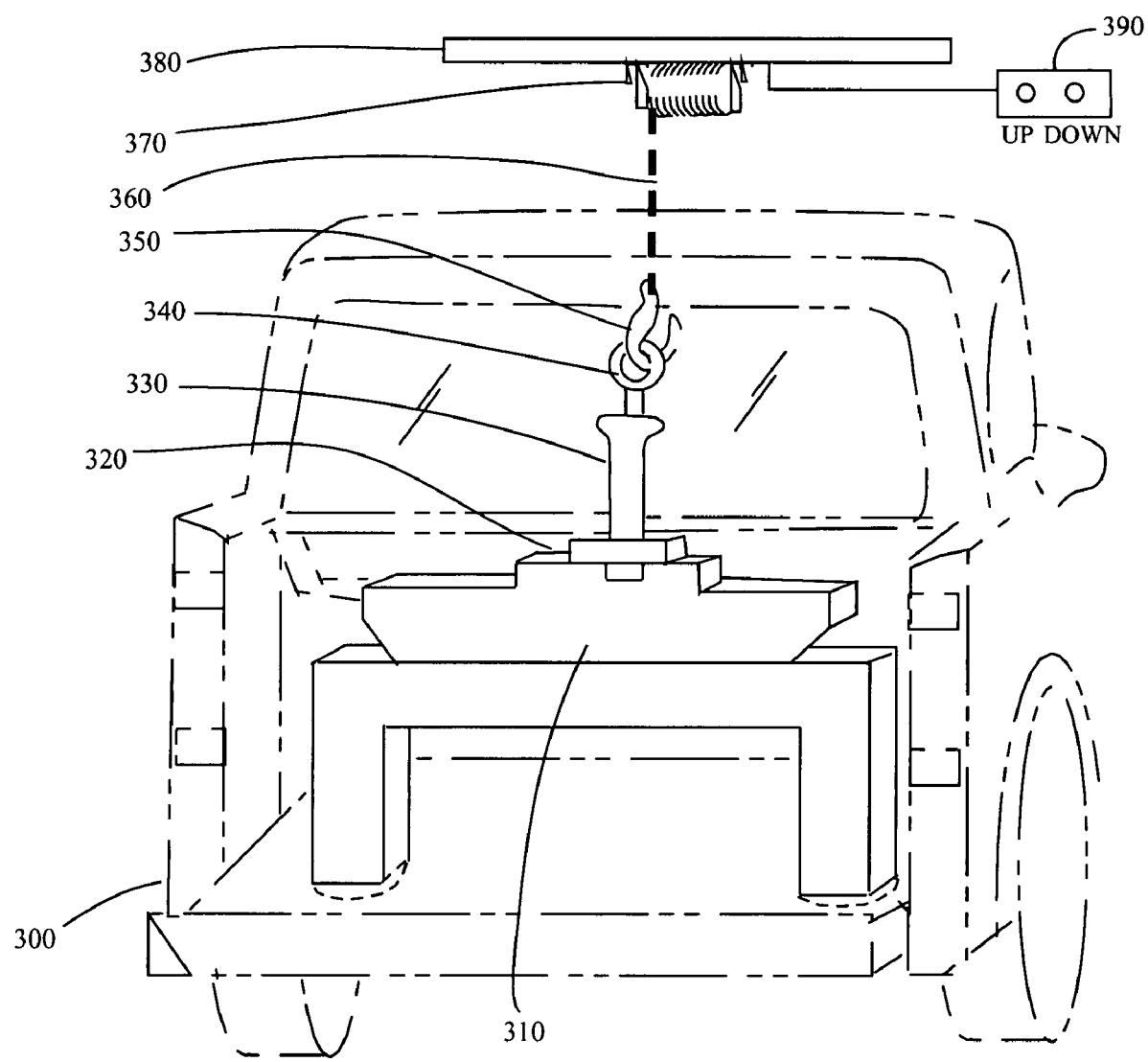
FIG. 3 is diagram of the preferred embodiment of the $5^{th}$ wheel hitch lifting device.

Now referring to FIG. 3 which shows the preferred embodiment of the hitch lifting system 10. In FIG. 3 is a rear view of pickup truck 300. Mounted in the bed of the pickup truck 300 is a $5^{th}$ wheel hitch 310. Integrated within the standard $5^{th}$ wheel hitch 310 is a kingpin mount 320.

Connected to the kingpin mount 320 is a modified kingpin 330. The modified kingpin 330 is a cylindrical shaft with a connector to the kingpin mount 320 on one end of the shaft and a loop 340 on the other end of the shaft. The loop 340 is dimensioned to allow a hoist clip 350 to connect to the loop 340. The hoist clip 350 is connected to a hoist cable 360. The hoist cable 360 is connected to a hoist 370. The hoist 370 is mounted to a support structure 380. The control of the hoist cable 360 is accomplished via a hoist control 390.

Figure 4:
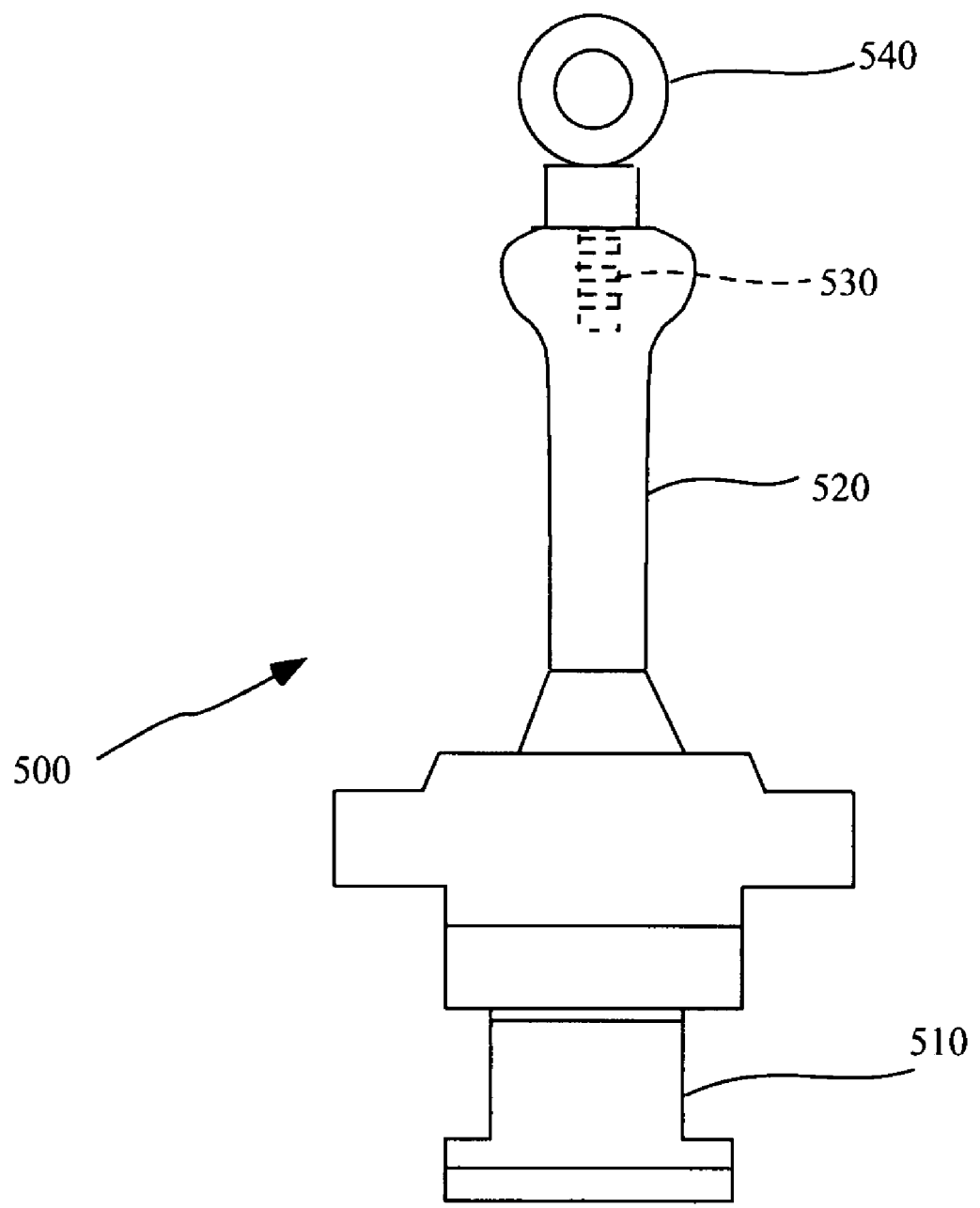
FIG. 4 is a detailed view of the modified kingpin.

Now referring to FIG. 4 in which a modified kingpin mount 500 is shown. The modified kingpin mount 500 consists of a hitch connector 510, the shaft 520 where the $5^{th}$ wheel trailer is attached, a threaded hole 530, and the loop 540. The loop 540 is used to attached the hoist clip 350 as shown in FIG. 3. Advantages of the detachable loop structure is that the modified kingpin mount 500 may be used as a standard kingpin (e.g. for use in attaching to a $5^{th}$ wheel trailer) with the loop 540 removed. Alternate embodiments of the modified kingpin mount 500 include integrating the loop 540 with the shaft 520. Advantages of the integrate loop 540 and shaft 520 are ease of manufacturing a shaft 520 without a threaded hole 530.

Now referring back to FIG. 3. The method of operation of the hitch lift device is straightforward. The operator (not shown) of the pickup truck 300 positions the bed of the pickup truck 300 such that the kingpin mount 320 is below the hoist clip 350. The hoist clip 350 is attached to the loop 340. Any clips, screws, or mounts (not shown) attaching the $5^{th}$ wheel hitch 310 to the bed of the pickup truck 300 must be removed.

The operator then activates the hoist control 390 such that cable draws the 5$^{th}$ wheel hitch 310 in the "up" position.

When the hitch is raised by the hoist in the "up" position, the hoist 370 acts as a convenient method for storing the 5$^{th}$ wheel hitch 310. The pickup truck 300 can drive out without the hitch installed with extra capacity in the truck bed. Upon returning, the pickup truck 300 can be positioned below the hoist 370 and the 5$^{th}$ wheel hitch 310 is then easily reinstalled in the truck bed simply by lowering the hoist.

An embodiment the hitch lift is 5$^{th}$ wheel hitch is a REESE 16K 5$^{th}$ wheel hitch 310 (see www.reeseprod.com), mounted in the bed of a pickup truck 300. The hoist 370 is a commercially available model 44006 Chicago Power Tools 440lb/880lb Electric Hoist ("44006 Hoist"). In this particular embodiment, the 44006 hoist is mounted between the rafters of a standard garage. A pickup truck with the 5$^{th}$ wheel hitch is backed into the garage and the clips on the hitch are detached. The modified kingpin is inserted into the hitch. The cable of the 44006 hoist is lowered and clipped to the eyelet of the modified kingpin. The cable is then raised with the hitch out of the bed of the truck.

Alternate embodiments of the hitch lift exist. Any 5$^{th}$ wheel hitch can employ the hitch lifting system. Likewise any type of hoist, electrical or mechanical, that can raise the 5$^{th}$ wheel hitch may be utilized. Similarly, a modified kingpin may be of any dimensions intended to serve the purpose of connecting with a 5$^{th}$ wheel hitch.

Accordingly, the hitch lifting device provides an easy and efficient way to raise and lower a 5$^{th}$ wheel hitch using a modified kingpin interface. Further, the description and illustrations are provided by way of example and are not intended to limit the scope or spirit of the invention. Those skilled in the art will be able to readily make minor variations in the design and manufacture of the invention. However, such variants are intended to be within the scope of the invention.

What is claimed is:

1. A hitch lifting apparatus, said hitch lifting apparatus comprising:
   a 5th wheel hitch;
   a modified kingpin, the modified kingpin further comprising a cylindrical shaft with a connector on one end of the shaft and a loop on the other end of the shaft, the modified kingpin connected to said 5th wheel hitch;
   and a hoist connected to said 5th wheel hitch; and a means for operatively lifting said 5th wheel hitch using said hoist.

2. The hitch lifting apparatus of claim 1 wherein said kingpin further comprises a shaft, a round shape with a diameter greater than said shaft, and a torus; said round shape connected on one end of said shaft and said torus connected on another end of said shaft.

3. The hitch lifting apparatus of claim 2 wherein said round shape is approximately from 2.75 to 3 inches in diameter.

4. The hitch lifting apparatus of claim 2 wherein said torus has an interior surface and an exterior surface, the interior surface being dimensioned to accommodate a hook.

5. The hitch lifting apparatus of claim 1 wherein said hoist is electrically operated.

6. The hitch lifting apparatus of claim 1 wherein said hoist is capable of lifting from 0 to 880 lbs.

7. A modified kingpin, said modified kingpin comprising; a shaft said shaft consisting of a first end and a second end, said first end connected to a round shape with a diameter greater than said shaft, and the second end connected to a torus;
   wherein the torus further comprises an inner diameter and an outer diameter.

8. The modified kingpin of claim 7 wherein said modified-kingpin further comprises a cylindrical pin and a void in the second end of said shaft, said cylindrical pin having a first end and a second end, said first end of said cylindrical pin connected to the outer diameter of the torus, said cylindrical pin being threaded; and said void having a means for receiving said cylindrical pin.

9. A method of lifting a 5th wheel hitch comprising; providing a modified kingpin, the modified kingpin further comprising a cylindrical shaft with a connector on one end of the shaft and a loop on the other end of the shaft,
   said modified kingpin is adapted to fit in the 5th wheel hitch, and a hoist, wherein said hoist cable is connected to said modified kingpin; and
   a) inserting said modified kingpin into said 5th wheel hitch; and
   b) attaching the hoist cable to said modified kingpin; and
   c) raising the 5th wheel hitch by reducing the length of the hoist cable.

* * * * *